Aug. 13, 1929.  J. EDGAR  1,724,699
MACHINE FOR GRINDING HOBS, WORMS, AND THE LIKE
Original Filed Feb. 21, 1921  8 Sheets-Sheet 1
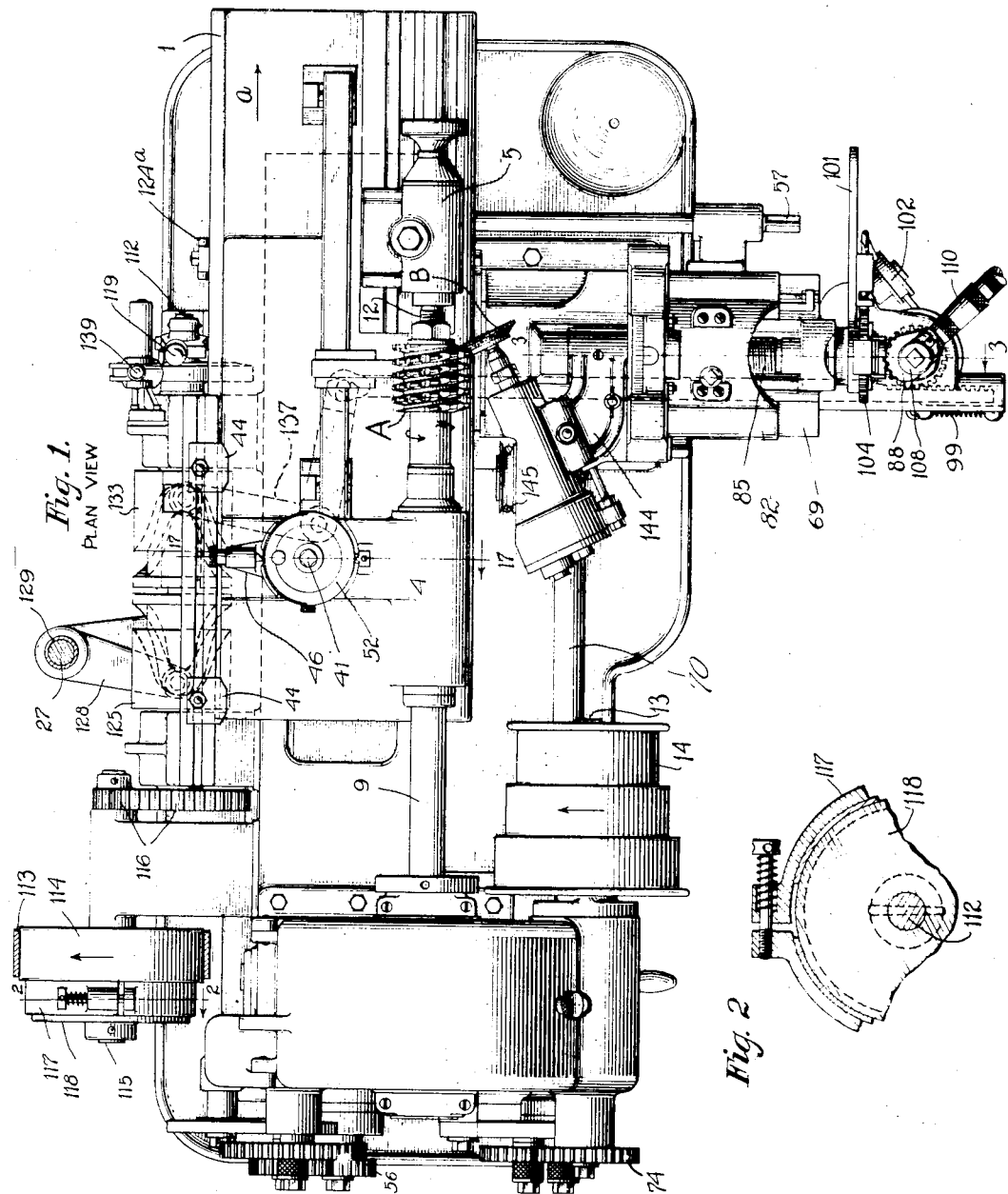
Inventor:
John Edgar
By Miller Churchill Barker
Attys

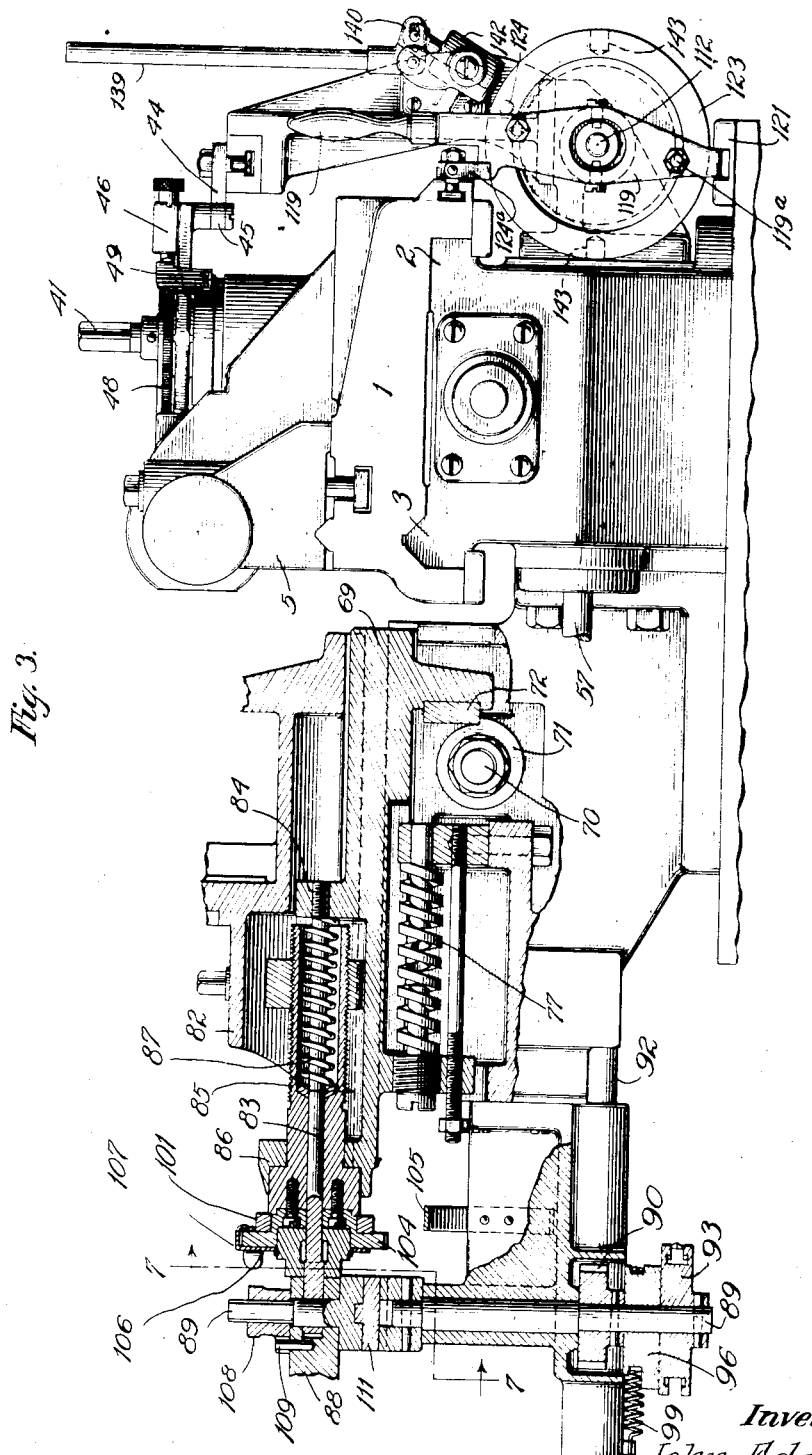

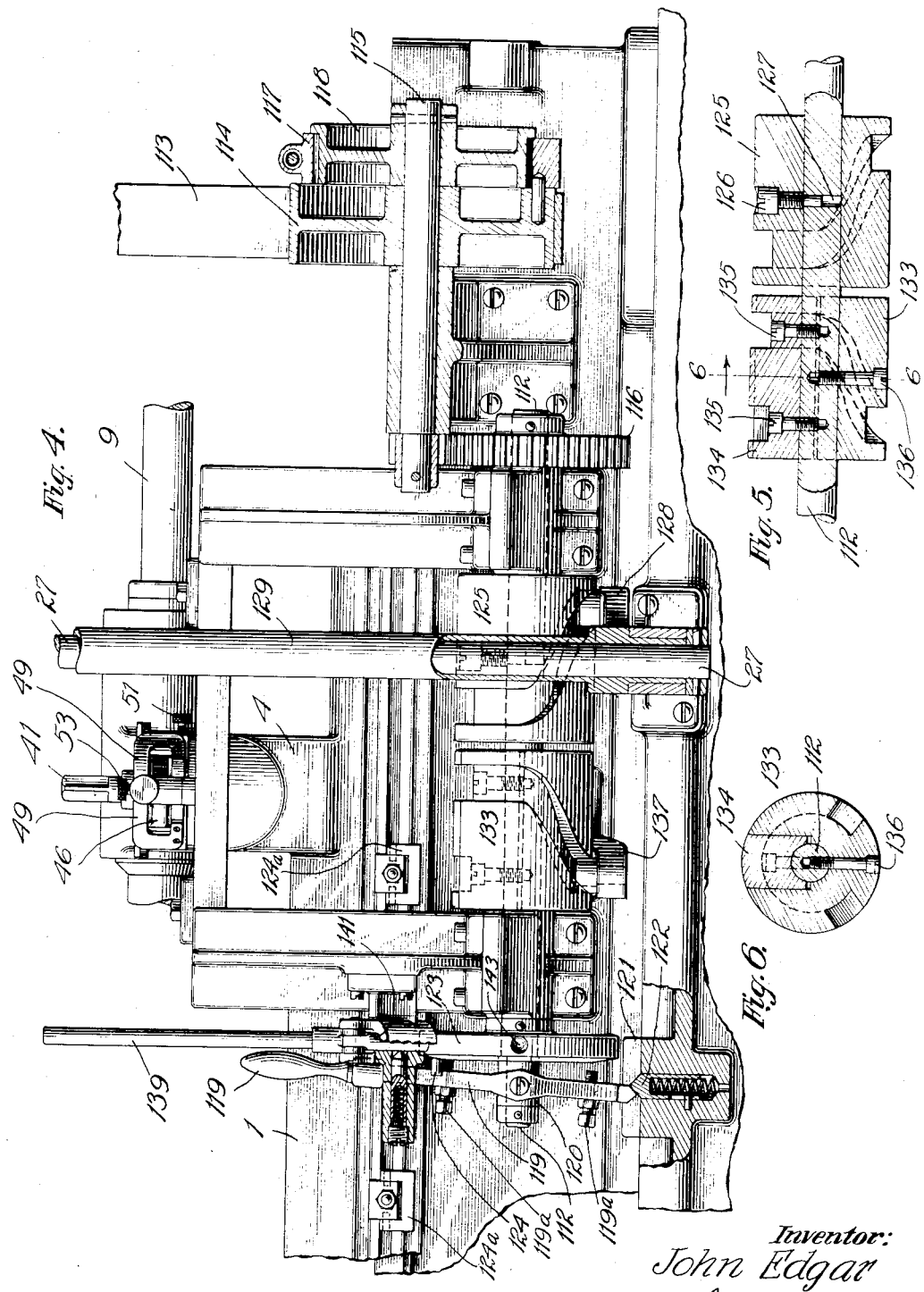

Aug. 13, 1929.   J. EDGAR   1,724,699
MACHINE FOR GRINDING HOBS, WORMS, AND THE LIKE
Original Filed Feb. 21, 1921   8 Sheets-Sheet 4
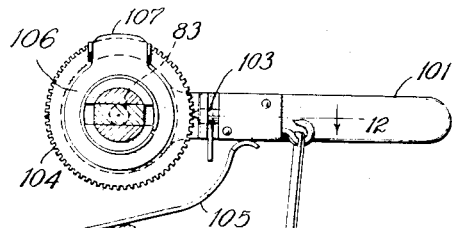
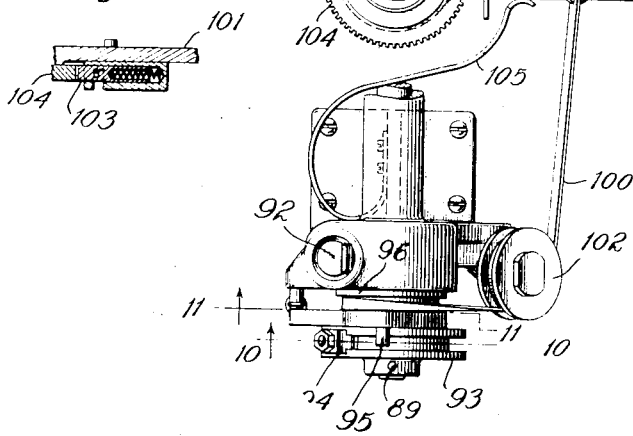
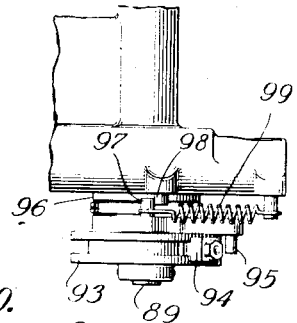
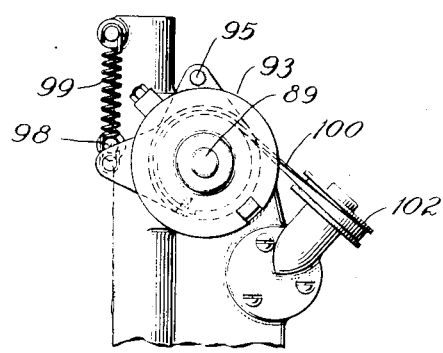
Inventor:
John Edgar

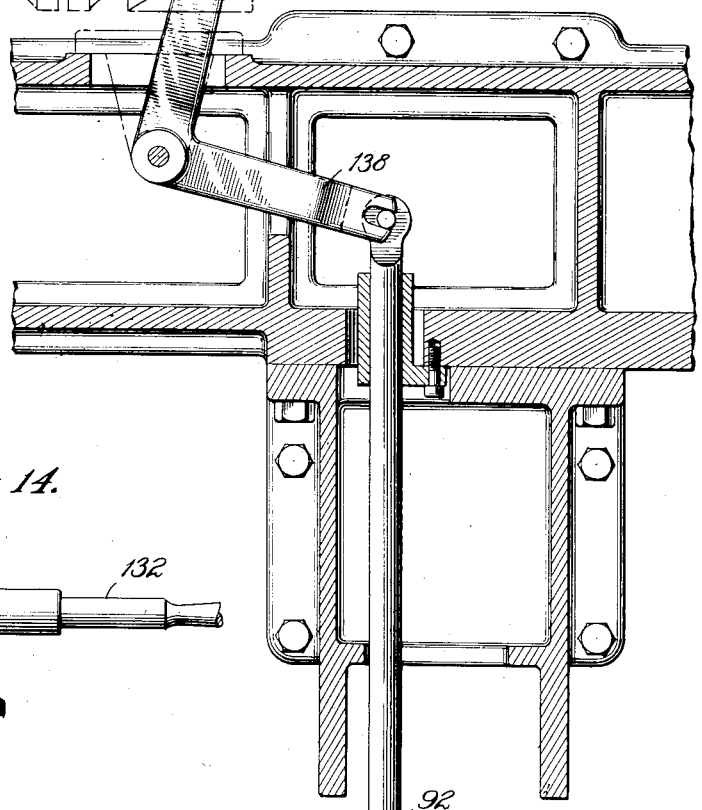

Aug. 13, 1929.　　　　　J. EDGAR　　　　　1,724,699
MACHINE FOR GRINDING HOBS, WORMS, AND THE LIKE
Original Filed Feb. 21, 1921　　8 Sheets-Sheet 6

Inventor:
John Edgar
By Miller Chindahl & Parker
Attys

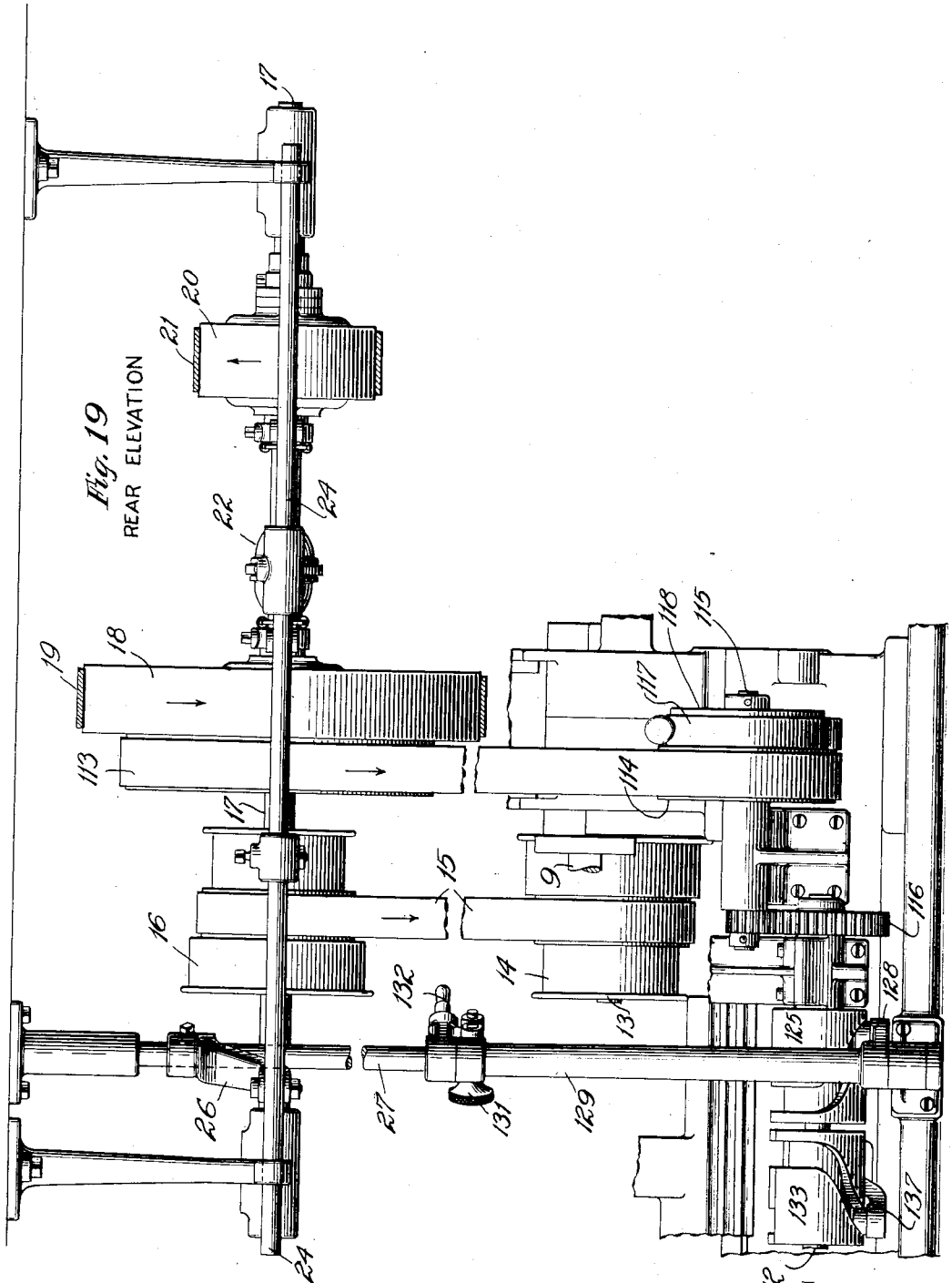

Aug. 13, 1929.  J. EDGAR  1,724,699
MACHINE FOR GRINDING HOBS, WORMS, AND THE LIKE
Original Filed Feb. 21, 1921   8 Sheets-Sheet 8
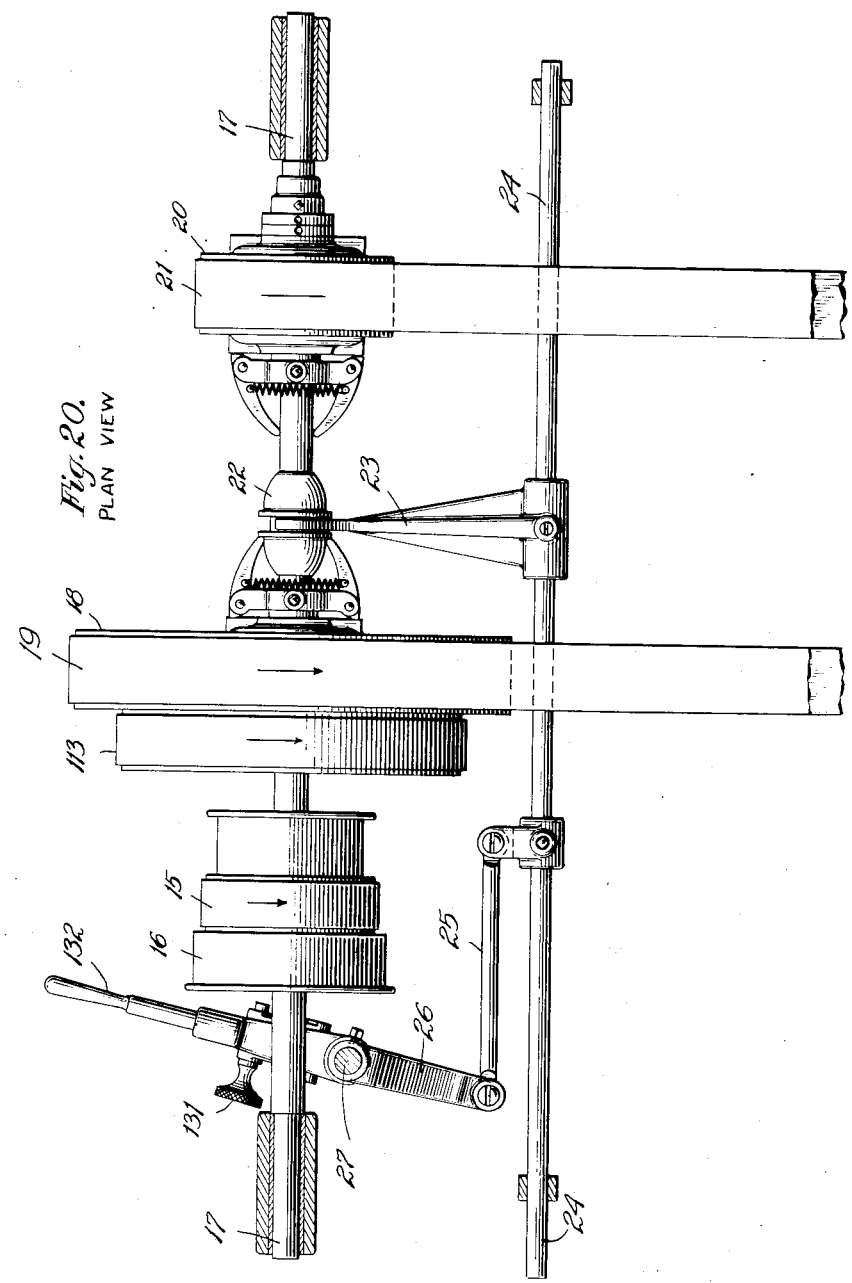
Inventor:-
John Edgar
By Miller Chindahl Baker
Attys Patented Aug. 13, 1929.

1,724,699

UNITED STATES PATENT OFFICE.

JOHN EDGAR, OF ROCKFORD, ILLINOIS, ASSIGNOR, BY MESNE ASSIGNMENTS, TO BARBER-COLMAN COMPANY, OF ROCKFORD, ILLINOIS, A CORPORATION OF ILLINOIS.

MACHINE FOR GRINDING HOBS, WORMS, AND THE LIKE.

Application filed February 21, 1921, Serial No. 446,901. Renewed May 14, 1926.

This invention relates to the manufacture of hobs and similar articles. After the partially-completed hob has been hardened, it is necessary to grind it to give its teeth the correct form and dimensions. A form of machine for performing such a grinding operation is disclosed in my copending application Serial No. 106,339, filed June 28, 1916 (Patent No. 1,561,064, dated November 10, 1925). In that machine the various operations of reversing the travel and rotation of the hob, moving the grinding wheel into and out of grinding position, and relatively adjusting the wheel and the hob radially and axially of the hob were performed or controlled by the operator. The object of the present invention is to provide automatic means for effecting the performance of the various operations in properly timed relation to each other.

Figure 16:
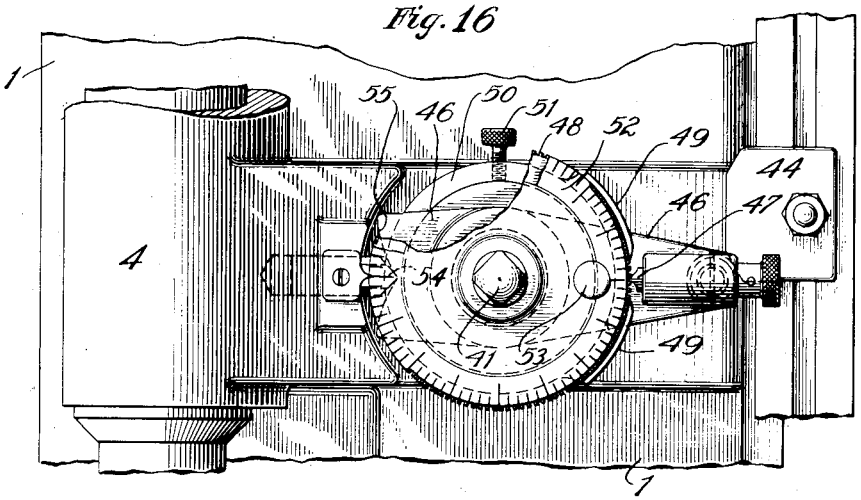
Figure 17:
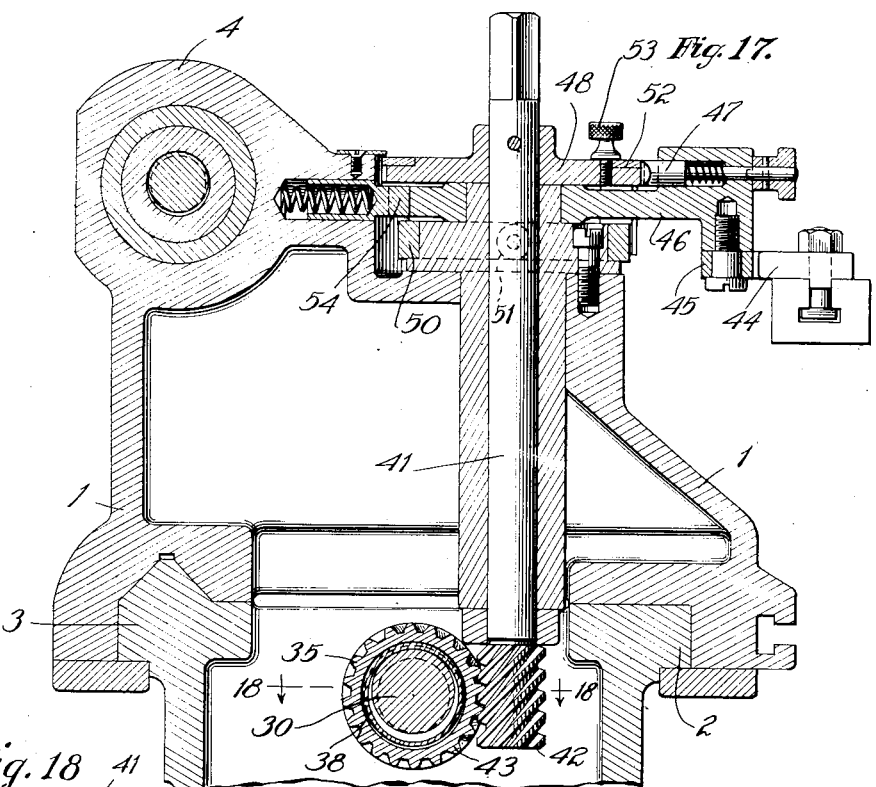
Figure 18:
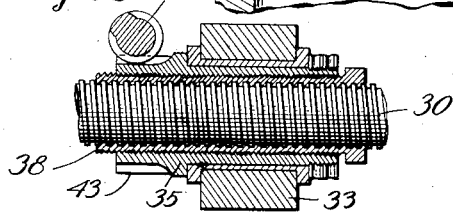

In the accompanying drawings, Figure 1 is a top plan view of a machine embodying the features of this invention. Fig. 2 is a fragmental sectional view of the friction driving means for the cam shaft. Fig. 3 is an end elevation of the machine, with parts in section. Fig. 4 is a rear elevation, illustrating the automatic controlling mechanism. Fig. 5 is a longitudinal sectional view of the cams. Fig. 6 is a section on line 6—6 of Fig. 5. Fig. 7 is a section on line 7—7 of Fig. 3, showing a portion of the cross or radial feed mechanism for the grinding wheel. Fig. 8 is an under side view of parts shown in Fig. 7. Fig. 9 is a side elevation of said parts. Fig. 10 is a section on line 10—10 of Fig. 7. Fig. 11 is a section on line 11—11 of Fig. 7. Fig. 12 is a section on line 12 of Fig. 7. Fig. 13 is a plan section illustrating the connection between the cam and the means for moving the wheel into and out of grinding position and for imparting the radial feed to the wheel. Fig. 14 is a section on line 14—14 of Fig. 15. Fig. 15 is a view, partly in section, illustrating the connection between the counter-shaft shifter rod and the shifter cam. Fig. 16 is a plan view of the longitudinal or axial feed mechanism. Fig. 17 is a sectional view of said mechanism. Fig. 18 is a sectional view taken in the plane of line 18—18 of Fig. 17, on a smaller scale. Fig. 19 is a rear view showing the counter-shaft and its connections with the machine. Fig. 20 is a plan view of the counter-shaft.

While the present invention is not limited to any particular type of hob-grinding or worm-grinding machine, it is herein disclosed as applied to or embodied in a machine generally similar to the one illustrated and described in the before-mentioned application Serial No. 106,339 (Patent No. 1,561,064).

Referring now to the drawings, and particularly to the top plan view entitled Fig. 1: A denotes a hob and B a grinding wheel. In operation, the grinding wheel B is rotated at high speed. The hob A is slowly rotated in the opposite direction and is also given a movement of translation past the grinding wheel, the rotation and movement of translation of the hob being so proportioned to each other that one side of the thread (or spiral series of teeth) of the hob is presented to the grinding wheel. After the hob has been fed past the grinding wheel, the latter is withdrawn from grinding position, the hob is returned to initial position and adjusted with relation to the grinding wheel so that the latter shall be able to remove more material, the grinding wheel is returned to grinding position, and the hob is rotated and fed past the grinding wheel as before. These operations are repeated until one side of the thread of the hob has been completely ground, whereupon the operator stops the machine. The head that carries the grinding wheel is then reversed so as to place the grinding wheel in position to grind the other side of the thread of the hob. The hob is then fed past the grinding wheel the desired number of times until the last-mentioned side of the thread has been properly ground.

A slide or work-table 1, upon which the hob is supported, is mounted upon two guides 2 and 3 (Fig. 3) formed upon the bed of the machine. Upon the slide 1 is a headstock 4 and a tail-stock 5. A spindle 9 (Fig. 1) is rotatably supported in the head-stock 4 and is suitably held against longitudinal movement in said head-stock. To the spindle 9 may be secured one end of the arbor 12 that carries the hob, the other end of the arbor being supported by the tail-stock. The means for rotating the spindle 9 comprises a suitable gear train, through which power is transmitted from a drive shaft 13 carrying a stepped pulley 14. Said pulley is driven through a belt 15 (Fig. 19)

from a stepped pulley 16 on a reversible countershaft 17 (Figs. 19 and 20). The countershaft is driven in one direction by means of a stepped pulley 18 loosely journaled on the countershaft and carrying upon its larger step a belt 19 that receives power from the line shaft (not shown). The countershaft is driven in the opposite direction by a smaller pulley 20 loosely journaled on the countershaft and carrying a belt 21 that extends from a pulley on the line shaft. The pulleys 18 and 20 are arranged to be clutched to and declutched from the countershaft 17 by suitable means including a friction spool 22 which is shiftable along the countershaft by means of a fork 23 fixed to a rod 24. Said rod is connected by a link 25 to a crank arm 26 fast upon a vertical rock shaft 27. The means for operating the shaft 27 will be hereinafter described.

The means for feeding the slide 1 comprises a feed screw 30 (Figs. 17 and 18) suitably supported in the machine frame. A bearing 33 is connected to the slide 1. Rotatably mounted in the bearing 33 is a sleeve 35 which is held against endwise movement with relation to the bearing 33. The sleeve 35 is threaded upon a nut 38 on the feed screw 30. The nut 38 is prevented from rotating with relation to the bearing 33 by any suitable means. When the feed screw 30 is rotated, the nut 38 will be caused to move longitudinally of said screw, the nut 38 carrying with it the sleeve 35 and the bearing 33 and thus imparting movement to the slide 1.

In order that the slide 1 shall be adjustable with relation to the nut 38 I provide a shaft 41 rotatably supported in the slide 1 and having upon its lower end spiral gear teeth 42 meshing with similar teeth 43 formed upon the sleeve 35. The upper end of the shaft 41 is squared to receive a crank. After the wheel B has made a cut and the slide 1 has been returned, the slide may be adjusted by means of the shaft 41 to permit the grinding wheel B to make another cut on the same side of the thread of the hob. In the present embodiment of the invention power means has been provided for effecting such adjustment of the slide. Said means includes two dogs 44 (Figs. 1 and 16) adjustably attached to the machine frame, one of said dogs being in position to be engaged by a roller stud 45 on one arm of a lever 46 which is fulcrumed on the axis of the shaft 41. The lever 46 carries a spring-pressed pawl 47 which is arranged to engage a ratchet wheel 48 fixed to the shaft 41. The extent of movement imparted to the ratchet wheel at each actuation of the pawl is controlled by one of two stop plates 49 fastened to a ring 50 which is adjustably secured to the slide 1 by a knurled screw 51. In the movement of the lever 46 caused by one of the dogs 44, the pawl 47 is withdrawn from the ratchet wheel 48 by one of the stop plates, said plates being adjustable so that from one to five teeth may be fed as desired. The total amount of adjustment of the slide 1 caused by successive actuations of the pawl 47 is determined by a stop plate or ring 52 which is rotatively adjustable upon the ratchet wheel 48 and is secured in adjusted position by means of a knurled screw 53. The stop ring 52 has a portion of larger diameter than the ratchet wheel, which portion keeps the pawl from engagement with the ratchet wheel when the desired amount of feed has been obtained. This ring is also graduated to, say, two tenths of a thousand so as to allow of feeding the slide a predetermined amount by means of a crank applied to the square upper end of the shaft 41.

The lever 46 is normally held in central position and is returned to that position by means of a spring-pressed wedge-shaped plunger 54 which acts against a V-shaped surface 55 on the lever.

The above-described adjustment of the slide to feed the wheel into the work is effected during either stroke of the slide, depending on the hand of the thread of the hob, there being a stop plate 49 at each side of the central position of the lever 46, and the pawl 47 being reversible by axial rotation through 180°. The pawl may also be held out of engagement with the ratchet wheel, when desired, by drawing the pawl outwardly and turning it through 90°.

The feed screw 30 is rotated through gearing 56 (Fig. 1) which is connected to the drive shaft 13. The feed screw may also be manually driven, when desired, by means of a shaft 57 geared to the feed screw as disclosed in said prior application.

The grinding wheel B is carried by a slide 69 (Fig. 3) which is reciprocable perpendicularly to the direction of movement of the slide 1. As a tooth of the hob revolves past the wheel B, the slide 69 is moved toward the slide 1 to maintain the wheel in proper relation to the tooth. As soon as the tooth has passed the wheel the slide 69 is given a quick outward movement to place the wheel B in position to grind the next succeeding tooth. The means for thus reciprocating the slide comprises a shaft 70 carrying a relieving cam 71 arranged to operate against a block 72 upon the slide 69. The shaft 70 is driven from the drive shaft 13 through a one-way clutch (not shown) and change gearing 74 (Fig. 1) as explained in said application. The slide 69 is moved away from the hob by means of a coiled expansion spring 77 (Fig. 3) arranged as described in the before-mentioned application.

Upon the slide 69 is mounted a slide 82 for movement parallel with the movement of the slide 69. When the wheel B is grinding the slide 82 is stationary with relation to the slide 69, but means is provided whereby the slide 82 may be moved to withdraw the grinding wheel from the thread of the hob after the hob has been fed past the wheel, and to advance the wheel into grinding position after the hob has been returned. Referring to Fig. 3: A rod or bar 83 is fixed to a lug 84 on the slide 69. On the bar 83 is slidably and rotatably mounted an adjusting or transverse-feed screw 85 which is slidably and rotatably supported in a guide 86 on the slide 69. A coiled expansion spring 87 surrounding the bar 83 bears at one end against the lug 84 and at its other end against a portion of the screw 85. The spring 87 is restrained by a cam 88 mounted on the upper portion of a shaft 89 carried by the slide 69. On the lower part of the shaft 89 is fixed a pinion 90 that meshes with a rack 91 (Fig. 13) on a reciprocatory rod 92. The means for reciprocating the rod 92 will be hereinafter described.

The transverse or radial feed of the wheel B is obtained in conjunction with the withdrawal of the wheel from the grinding position. Fixed to the lower end of the shaft 89 is a dog plate 93 (Figs. 7 to 10) having an adjustable dog 94 that operates against a pin 95 in a sheave or winding drum 96 loosely journaled on the axis of the shaft 89. A stop pin 97 on the sheave 96 is normally held against a stop pin 98 on the machine frame by a coiled contractile spring 99. A tape 100 is attached at one end to the sheave 96 and at its other end to a lever 101, the tape being guided by a sheave 102. The lever 101 is fulcrumed on the axis of the cross or transverse-feed screw 85 and carries a ratchet pawl 103 (Figs. 7 and 12) that engages a ratchet wheel 104 fixed to the cross-feed screw 85. A leaf spring 105 returns the lever 101 to normal position after each actuation. Rotation of the cam shaft 89 in the action of returning the wheel B to grinding position brings the dog 94 against the pin 95 on the sheave 96, whereupon the latter rotates with the cam shaft and operates the lever 101 to rotate the cross-feed screw 85. The total amount of feed caused by successive actuations of the lever 101 is controlled by means of a plate 106 (Fig. 7) adjustably attached to the ratchet wheel 104 and having a portion 107 that overlies the periphery of the wheel, said portion 107 serving to hold the pawl 103 out of engagement with the ratchet wheel. The pawl 103 is reversible by rotation through 180° so that the cross-feed screw 85 may be returned to initial position by manual operation of the lever 101.

Manual operating of the wheel slide 82 to bring the wheel B into grinding position or its withdrawal therefrom is provided for by making the cam 88 disconnectable from the cam shaft 89. A locking block 108 (Fig. 3) fits removably upon the square upper end of the cam shaft and is notched to engage a pin 109 on the cam. A hand lever 110 is fixed to the cam. With the block 108 removed the cam may be manually operated to retract and advance the grinding wheel.

In order that the wheel slide 82 may be reciprocated by the relieving cam 71 while the cam shaft 89 is being turned by the gearing 90—91, the cam shaft is made in two sections as shown in Fig. 3, the pinion 90 being attached to the lower section, the cam being connected to the upper section, and the two sections being connected by an "Oldham" coupling 111 that permits lateral displacement of the upper section while the shaft is being rotated.

The means for automatically effecting, in properly timed relation, the reversal of the countershaft 17 (which rotates the spindle 9 and the feed-screw 30) and the reciprocation of the rod 92 (which produces the withdrawal, return and cross-feed of the grinding wheel) will now be described.

A cam shaft 112 (Figs. 1, 3 and 4) is supported in bearings in the machine frame in parallel relation to the feed screw 30, and is arranged to be intermittently driven from the line shaft by means including a belt 113 (Fig. 19) running on the smaller step of the constantly rotated pulley 18. The belt 113 runs around a pulley 114 loosely journaled on a shaft 115 that is connected to the cam shaft 112 by gearing 116. Attached to the pulley 114 is a friction band 117 (Fig. 2) that encircles a drum 118 fast on the shaft 115. The friction band 117 is clamped to the drum 118 by sufficient spring pressure to create pull enough to operate the cam shaft 112 when said shaft is free to rotate, but slips when the cam shaft is locked against rotation. The locking means comprises a lever 119 (Figs. 3 and 4) pivoted intermediate its ends to a sleeve 120 rotatably mounted on the cam shaft 112. The lever 119 is prevented from rotating on the axis of the cam shaft by means of a guide 121 having a groove into which the lower end of the lever extends. The lower end of the lever is made V-shape to engage with a similarly-shaped spring-pressed pin 122 (Fig. 4) which serves to complete the movement of the lever into either of its two operative positions. The throw of the lever 119 is limited through contact of adjusting screws 119ᵃ on said lever with a disk 123 fixed on the cam shaft. The disk 123 carries a locking pin 124 arranged to impinge upon the locking lever 119. Said lever is caused to swing into position where one of its arms is in the orbit of the pin 124 by means of two dogs 124ᵃ adjustably pivoted to the slide 1 in position to impinge upon the lever 119 near the ends of the travel of the slide. When the lever 119 is thus shifted, the cam shaft 112 is released to rotation through one-half of a revolution until the pin 124 again engages with the lever 119 at a diametrically opposite position.

A cam 125 (Figs. 4 and 5) is fixed upon the shaft 112 by means of a screw 126 adapted to enter opposite ends of an opening 127 extending radially through the shaft. In the groove of said cam is a roller stud carried by an arm 128, said arm being fixed to the lower portion of a tube 129. The lower end of the tube 129 is journaled in a bearing in the machine frame. The rock shaft 27 extends through said tube. The tube and the rock shaft are detachably connected for oscillation in unison by means of a link 130 (Figs. 14 and 15), one end of said link being pivoted to the tube and the other end of the link being perforated to receive a pin 131. To the shaft 27 is fixed a hand lever 132 having a perforated lug to receive the pin 131. Rotation of the cam 125 through one-half of a revolution will cause the shaft 27 to turn to clutch one or the other of the pulleys 18 and 20 to the countershaft 17.

A cam 133 (Figs. 4 and 5) is fixed upon the shaft 112, said cam being so constructed that it may be removed, turned end for end and replaced. As shown in Fig. 6, the body of the cam 133 has a longitudinal recess extending to the center of the cam to receive a block 134. The block 134 is secured to the shaft 112 by means of two screws 135, while the body of the cam is secured in place by a screw 136. In the groove of the cam 133 runs a roller stud on one arm 137 (Fig. 13) of a bell-crank lever, the other arm 138 of said lever being connected to the rod 92. One revolution of the cam 133 will cause one reciprocation or two strokes of the rod 92.

Means is provided for manually stopping the machine when one side of the thread of the hob has been completely ground. Said means comprises a hand lever 139 (Figs. 3 and 4) pivoted to the machine frame and having a crank arm 140 which has a pin and slot connection with a plunger or detent pin 141 slidably mounted in a guide 142 on the frame. The lower end of said plunger is adapted to enter either of two diametrically opposite holes 143 in the periphery of the disk 123. The holes 143 are so located with reference to the pin 124 that when the plunger 141 is in one of said holes the cam shaft 112 is in position to hold the clutch spool 22 in neutral position and the grinding wheel B in withdrawn position.

The drawings show the machine in position as when grinding a single-thread right-hand hob, the slide or work table 1 being in motion in the direction indicated by the arrow a in Fig. 1, and the hob being rotated so that one side of the thread of the hob shall be presented to the grinding wheel.

The described motion of the slide and the hob will continue until the slide nears the end of its travel, when one of the dogs 124ª on the slide trips the lock lever 119, whereupon the cam shaft 112 makes a half-revolution. In such half-revolution of the cam shaft the cam 133 through the medium of the rod 92 withdraws the wheel B from the grinding position, and the cam 125 shifts the clutch spool 22 into position to declutch the pulley 18 and clutch the pulley 20 to the counter-shaft, thereby reversing the direction of rotation of the hob and its direction of axial movement or movement of translation. As the work table 1 nears the end of the reverse stroke, the other dog 124ª trips the lock lever 119, whereupon the cam 133 returns the wheel B to grinding position and the cam 125 declutches the pulley 20 and clutches the pulley 18 to the counter-shaft, thereby again reversing the direction of rotation and movement of translation of the hob. When the wheel B was withdrawn from grinding position, the lever 101 (Figs. 1 and 7) caused a radial or cross-feed movement of the wheel. At the end of each stroke of the work table in the direction indicated by the arrow a, the right-hand dog 44 (Fig. 1) actuates the lever 46 to adjust the work-table with reference to the nut 38, so that the wheel B shall remove more material upon the succeeding stroke in the direction denoted by said arrow. This cycle of operations is repeated until one side of the thread of the hob has been completely ground, when the cross-feed of the wheel B and adjustment of the relation of the slide 1 to the nut 38 cease. The operator thereupon stops the machine by means of the hand lever 139, the wheel B being then in withdrawn position. The operator then reverses the pawl 103 (Fig. 12) and operates the lever 101 to return the cross-feed screw to initial position, after which he returns the pawl 103 to normal position. The operator also withdraws the pawl 47 (Fig. 16) and operates the shaft 41 by means of a crank to restore the slide 1 to initial relation to the nut 38, after which he restores the pawl 47 to working position. The frame 144 that carries the grinding wheel is then swung through an arc of 180° as explained in the before-mentioned application, and the belt 145 that drives the grinding wheel is removed, twisted and replaced. The operator then operates the hand lever 139 to set the machine in operation. After the second side of the thread has been completely ground, the machine is stopped by means of the lever 139.

Either the cross-feed of the wheel or the feed of the hob up to the wheel by means of the shaft 41 may be dispensed with when desired, the tape 100 being detached from the lever 101, or the pawl 47 being held out of engagement with the ratchet wheel 48.

By removing the locking pin 131 (Fig. 14) the counter-shaft may be controlled by means of the hand lever 132, as is desirable when setting up the machine; or, if desired, a hob may be ground entirely by manual operation of the counter-shaft.

When a left-hand hob is to be ground, the cam 125 is turned on the shaft 112 through an arc of 180°, and the cam 133 is removed from the shaft, turned end for end and replaced. The other dog 44 is adjusted into position to act upon the roller stud 45, and the pawl 47 is reversed. An idler gear (not shown) is also introduced into the change gear train 56 so as to reverse the direction of feed movement of the work table 1.

Although the present embodiment of the invention has been described with considerable particularity, it is to be understood that various changes may be made without departing from the spirit and scope of the invention as set forth in the appended claims.

I claim as my invention:

1. A grinding machine having, in combination, a grinding wheel, a slide, means on the slide for rotatably supporting a hob or the like with its axis extending in the direction of movement of the slide, a feed screw for moving the slide, a nut on said screw, means connecting the nut to the slide, and power means for adjusting said connection to move the slide with relation to the nut longitudinally of the screw.

2. A grinding machine having, in combination, a grinding wheel, a slide, means on the slide for rotatably supporting a hob or the like with its axis extending in the direction of movement of the slide, means for moving the slide to carry the hob past the wheel, and power-actuated means automatically operable at the end of a cutting stroke of said slide for effecting relative adjustment between the hob and the wheel radially and axially of the hob.

3. A grinding machine having, in combination, a grinding wheel, means for feeding a hob or the like relative to said wheel, a cam shaft, and a cam on said shaft for moving said grinding wheel relative to said hob, said cam being removable and reversible with respect to said cam shaft.

4. A grinding machine having, in combination, a grinding wheel, means for feeding a hob or the like relative to said wheel, a cam shaft, a cam on said shaft for controlling the direction of movement of said hob, and a second cam on said shaft for moving said wheel with respect to said hob, said first mentioned cam being non-removable but rotatable relative to said cam shaft and said second mentioned cam being removable and reversible with respect to said shaft for operation on either right hand or left hand hobs.

5. A grinding machine having, in combination, a grinding wheel, a slide, means on said slide for rotatably supporting a hob or the like for movement relative to said wheel, a feed screw for moving said slide, a nut for said screw on said slide, means connecting said nut to said slide, power means automatically operable to adjust said connection to move the slide relative to said nut along said screw, and adjustable means adapted automatically to limit the extent of adjustment of said connection.

6. A grinding machine having, in combination, a grinding wheel, means for rotating a hob or the like, means for axially feeding and returning the hob relatively past the wheel, said feeding being in timed relation to the rotation of the hob, means for withdrawing the wheel during the returning movement of the hob, and means for automatically and periodically imparting a feed movement to the wheel radially of the hob during the returning feed motion.

7. A grinding machine having, in combination, a movable member, a grinding wheel on said member, means for rotating and axially feeding a hob or the like past the wheel, means for moving said member to withdraw the wheel from grinding position near one end of the feed movement of the hob and to return the wheel to grinding position near the other end of said feed movement, and means for automatically imparting a feed movement to the wheel radially of the hob during the movement of said member.

8. A grinding machine having, in combination, a movable member, a grinding wheel on said member, means for rotating and axially feeding a hob or the like past the wheel, means for automatically moving said member to withdraw the wheel from grinding position near one end of the feed movement of the hob and to return the wheel to grinding position near the other end of said feed movement, and means for automatically adjusting said member to place the wheel nearer the axis of the hob during the beforementioned movement of said member.

9. A grinding machine having, in combination, a grinding wheel, means for rotating and axially feeding a hob or the like past the wheel, a counter-shaft for driving said means, a cam shaft, a cam on said cam shaft arranged to reverse the direction of rotation of said counter-shaft, means for moving the wheel into and out of grinding position, and a cam on said cam shaft arranged to actuate said wheel-moving means.

10. A grinding machine having, in combination, a grinding wheel, means for rotating and axially feeding a hob or the like past the wheel, a counter-shaft for driving said means, a cam shaft, a cam on said cam shaft arranged to reverse the direction of rotation of said counter-shaft, means for moving the wheel into and out of grinding position, a cam on said cam shaft arranged to actuate said wheel-moving means, means tending to rotate said cam shaft, means to lock the cam shaft against rotation, and means traveling with the hob for operating said locking means.

11. A grinding machine having, in combination, a grinding wheel, a slide movable with respect thereto and arranged to support a hob or the like to be operated upon by said wheel, a feed screw for moving said slide, a nut for said screw connected to said slide, power means adapted automatically to adjust said connection to change the relation of said nut to said slide and with respect to said screw, and a member arranged to be advanced continuously in the adjustment of said connection adapted to prevent more than a predetermined total adjustment thereof.

12. A grinding machine having, in combination, a grinding wheel, a slide movable with respect thereto and arranged to support a hob or the like to be operated upon by said wheel, a feed screw for moving said slide, a nut for said screw connected to said slide, power means adapted automatically to adjust said connection to change the relation of said nut to said slide and with respect to said screw, a member arranged to be advanced continuously in the adjustment of said connection adapted to prevent more than a predetermined total adjustment thereof, and manually operable means for adjusting said member.

13. A grinding machine having, in combination, a grinding wheel, a slide movable with respect thereto and arranged to support a hob or the like to be operated upon by said wheel, a feed screw for moving said slide, a nut for said screw connected to said slide, power means adapted automatically to adjust said connection to change the relation of said nut to said slide and with respect to said screw, and a member arranged to be advanced continuously in the adjustment of said connection to prevent more than a predetermined total adjustment thereof, said member being adapted for manual operation and having graduations to indicate degrees of adjustment thereof.

14. A grinding machine having, in combination, a grinding wheel, a slide reciprocable relative to said wheel adapted to support a hob or the like to be operated upon by said wheel, a feed screw for moving said slide, a nut having an adjustable connection with said slide, a member for adjusting said connection to change the relation of said nut to said slide and with respect to said screw, and an element operable in the reciprocation of said slide to move said member, said element being adapted normally to move to a central operative position after each operation thereof by said slide.

15. A grinding machine having, in combination, a grinding wheel, means for supporting a hob or the like to be rotated and moved relative to said wheel to be operated upon thereby, means for moving said wheel automatically toward and away from said hob in the operation of said machine, and means for automatically and periodically imparting an additional feed movement to the wheel relative to said hob upon withdrawal from grinding position of said wheel.

16. A grinding machine having, in combination, a grinding wheel, means for supporting a hob or the like to be turned and moved with respect to said wheel to be operated upon thereby, a support for said grinding wheel, means adapted to move said support periodically toward and away from said hob, cooperating means automatically and periodically operable in the movement of said support to impart a feed movement to the wheel with respect to said hob, adjustable means for limiting the degree of each of said periodical adjustments of said wheel, and adjustable means for limiting the total adjustment thereof.

17. A grinding machine having, in combination, a grinding wheel, a slide arranged to carry a hob or the like to be rotated and moved with respect to said wheel to be operated upon thereby, a support for said grinding wheel movable toward and away from said hob in timed relation to the rotation thereof, a feed screw for effecting feed movements of said wheel with respect to said hob, a ratchet member adapted for manual operation to adjust said feed screw, and means automatically and periodically operable in the operation of said machine for operating said member.

18. A grinding machine having, in combination, a grinding wheel, a positively operated work carriage movable relative to said wheel and arranged to support a hob to be operated upon thereby, an impositively driven control shaft, a locking member for said shaft adapted to hold the same against operation in the movement of said carriage relative to said wheel, means on said control shaft adapted in the operation of the latter to reverse the direction of movement of said carriage, and means on said shaft operable in the operation of the latter to move said wheel with respect to said hob, said locking member being adapted at the end of an operating movement of said carriage to be released to permit the operation of said control shaft.

19. A hob grinding machine having, in combination, a grinding wheel, a slide movable relative to said wheel and arranged to support the hob, an impositively driven control shaft, a locking member for said shaft adapted to hold the same against operation in the movement of said slide relative to said wheel, means on said control shaft adapted in the operation of the latter to reverse the direction of movement of the slide, and means on said shaft operable in the operation of the latter to move the wheel with respect to the hob, said locking member being adapted at the end of an operating movement of the slide to be released to permit the operation of said control shaft.

20. A hob grinding machine having, in combination, a grinding wheel, means for supporting a hob for rotation and longitudinal movement with respect to said wheel, a feed screw for effecting relative movement between the wheel and the hob, adjusting means for said feed screw arranged to be automatically and periodically operated in the operation of said machine, to progressively increase the depth of successive cuts, and adjustable means adapted automatically to prevent more than a predetermined amount of total adjustment of said wheel with respect to the hob.

21. A hob grinding machine having, in combination, a grinding wheel, means for supporting a hob for rotation and longitudinal movement relative to said wheel, means for causing relative relieving movement between said wheel and the hob toward and away from each other, and means for automatically and periodically producing a relative feed movement between the wheel and the hob.

22. A grinding machine having, in combination, a movable member, a grinding wheel on said member, means for rotating and axially feeding the work past the wheel, mechanism for automatically moving said member to withdraw the wheel from grinding position near one end of the feed movement of the work and to return the wheel to grinding position near the other end of said feed movement, and means for automatically adjusting said member to place the wheel nearer the axis of the work after each axial feeding movement of the work.

23. A hob grinding machine having, in combination, a grinding wheel, means for rotating and axially feeding a hob past the wheel, means for automatically reciprocating the wheel to relieve the teeth of the hob, and mechanism for automatically and in properly timed relation moving the wheel into and out of grinding position and reversing the direction of rotation and feed movement of the hob.

24. In a machine for grinding hobs, the combination with a carriage, and a slide movable transversely with respect to the carriage, of means for effecting relieving movements by the slide, automatic means for reciprocating the carriage with respect to the slide, and automatic means for starting the relieving movements when the carriage is moved in one direction and for stopping the relieving movements when the carriage is moved in an opposite direction.

25. In a machine tool, the combination with a carriage, a slide movable transversely with respect to the carriage, and means for effecting relieving movements by the slide, of automatic means for reciprocating the carriage with respect to the slide, and automatic means for moving the slide toward the blank and for starting relieving movements when the carriage is moved in one direction and for stopping the relieving movements and for moving the slide away from the carriage when the carriage is moved in an opposite direction.

26. In a machine tool, the combination with a carriage, a slide movable transversely with respect to the carriage, and means for effecting relieving movements by the slide, of automatic means for reciprocating the carriage with respect to the slide, automatic means for feeding the slide toward the carriage in accordance with the movement of the carriage, and automatic means for starting the relieving movements when the carriage is moved in one direction and for stopping the relieving movements when the carriage is moved in an opposite direction.

27. In a machine tool, the combination with a carriage for supporting a rotating blank, and a slide for supporting a rotating cutting tool, of means for effecting relieving movements by the slide with respect to the blank, automatic means for moving the blank with respect to the tool and for returning the carriage to initial position when the blank and tool occupy predetermined relative positions, automatic means for stopping the relieving movements and for separating the tool from the blank when the carriage is moving in one direction, and for starting the relieving movements and moving the tool into engagement with the blank when the carriage is moved in an opposite direction.

In testimony whereof, I have hereunto set my hand.

JOHN EDGAR.